(12) United States Patent
Rabin et al.

(10) Patent No.: US 8,893,349 B1
(45) Date of Patent: Nov. 25, 2014

(54) WINDSHIELD BLADE LOCKING MECHANISM

(76) Inventors: Isaac M. Rabin, Atlanta, GA (US); Steven Wang, Wuxi (CN)

(*) Notice: Subject to any disclaimer, the term of this patent is extended or adjusted under 35 U.S.C. 154(b) by 93 days.

(21) Appl. No.: 13/136,242

(22) Filed: Jul. 27, 2011

(51) Int. Cl.
*B60S 1/04* (2006.01)

(52) U.S. Cl.
USPC ............ 15/257.01; 15/250.16; 15/250.001; 248/503; 248/206.2

(58) Field of Classification Search
USPC ........... 15/250.001, 257.01, 250.16, 250.19, 15/268; 248/683, 205.5, 208, 316.1, 248/205.8, 206.3, 503, 206.2; 29/468, 559; 294/183, 187
See application file for complete search history.

(56) References Cited

U.S. PATENT DOCUMENTS

| | | | | |
|---|---|---|---|---|
| 1,687,412 A * | 10/1928 | White, Jr. | ..................... | 15/250.16 |
| 1,772,439 A * | 8/1930 | Garbs | ........................ | 248/205.5 |
| 1,859,594 A * | 5/1932 | Meyer et al. | ................ | 248/206.3 |
| 2,100,918 A * | 11/1937 | Ringman | ....................... | 182/107 |
| 2,190,463 A * | 2/1940 | Watt | ................................ | 24/569 |
| 2,306,980 A * | 12/1942 | Roberts | ....................... | 15/250.19 |
| 2,886,277 A * | 5/1959 | Boham et al. | ............... | 248/205.5 |
| 4,022,412 A * | 5/1977 | Houlf | ............................. | 248/674 |
| 4,170,995 A * | 10/1979 | Levine et al. | ................. | 604/180 |
| 5,106,177 A * | 4/1992 | Dolasia | ......................... | 359/876 |
| 5,695,164 A * | 12/1997 | Hartmann et al. | ......... | 248/316.4 |
| 6,966,533 B1 * | 11/2005 | Kalis et al. | .................. | 248/316.4 |
| 7,503,540 B2 * | 3/2009 | Hood | ............................ | 248/537 |

* cited by examiner

*Primary Examiner* — Mark Spisich
*Assistant Examiner* — Andrew A Horton
(74) *Attorney, Agent, or Firm* — Denton Intellectual Property Law Firm LLC; F. Russell Denton

(57) ABSTRACT

The invention provides an apparatus to hold one or more windshield wipers stationary against a vehicle window. The apparatus comprises a window placement module comprising a vacuum cup that has a vacuum zone and an attachment means that is located at a point on the cup other than within the vacuum zone. The attachment means is linked to a first point of each of one or more arms; a second point of each arm is linked to a clamping module optionally in a rotatable way. When in use the clamping module constrains movement of a windshield wiper.

7 Claims, 7 Drawing Sheets

Caricature of an upper view of an illustrative, non-exclusive embodiment of a device according to the invention when locking windshield wipers on a vehicle window.

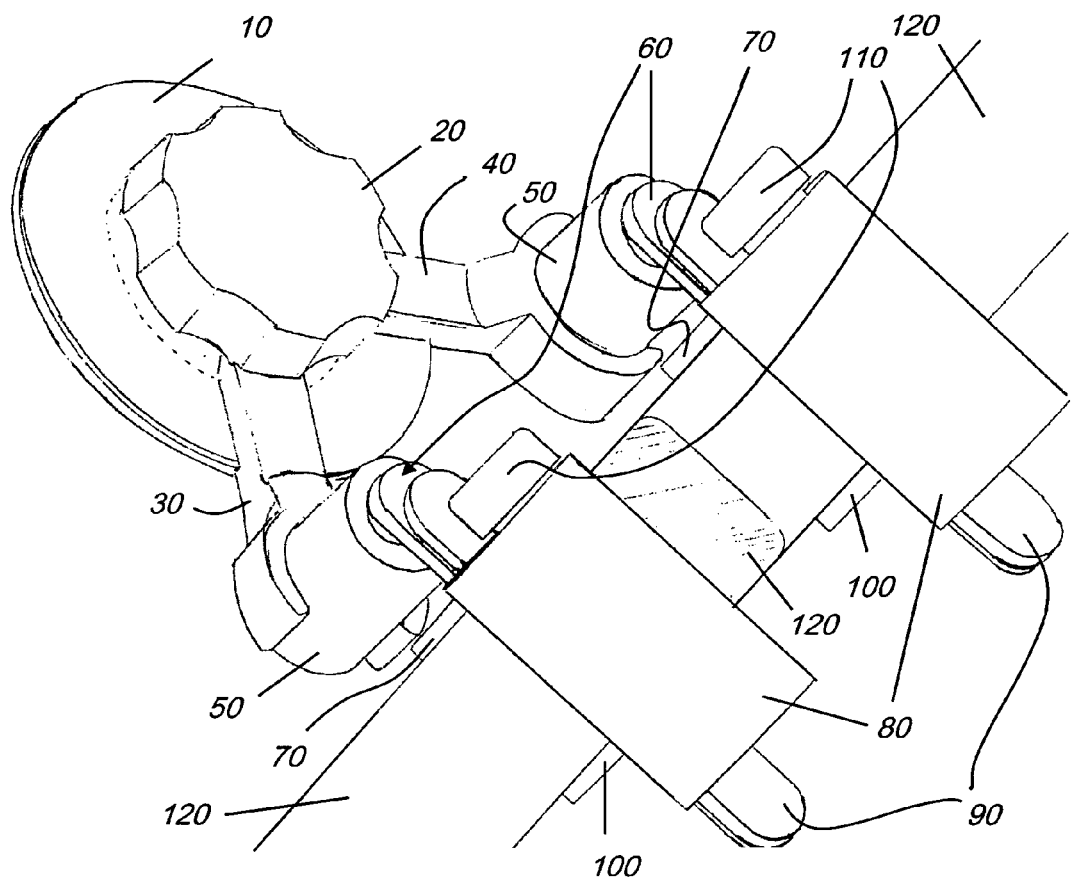
*FIGURE 1:* Caricature of an upper view of an illustrative, non-exclusive embodiment of a device according to the invention when locking windshield wipers on a vehicle window.

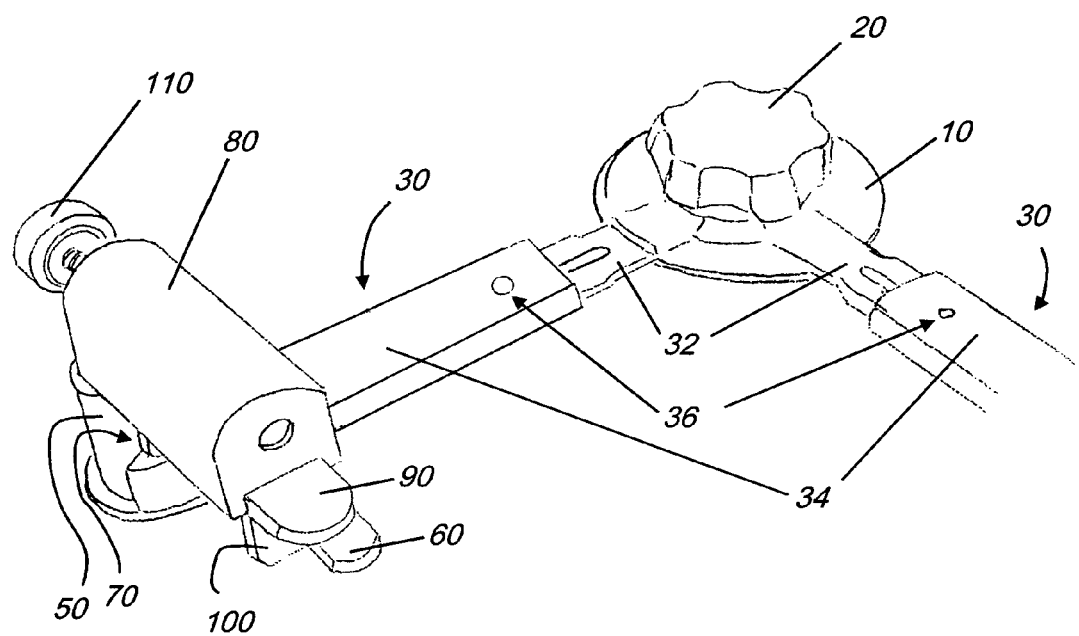
*FIGURE 2:* Caricature of an upper view of an illustrative, non-exclusive embodiment of a device according to the invention illustrating the outmost end of a lock's housing.

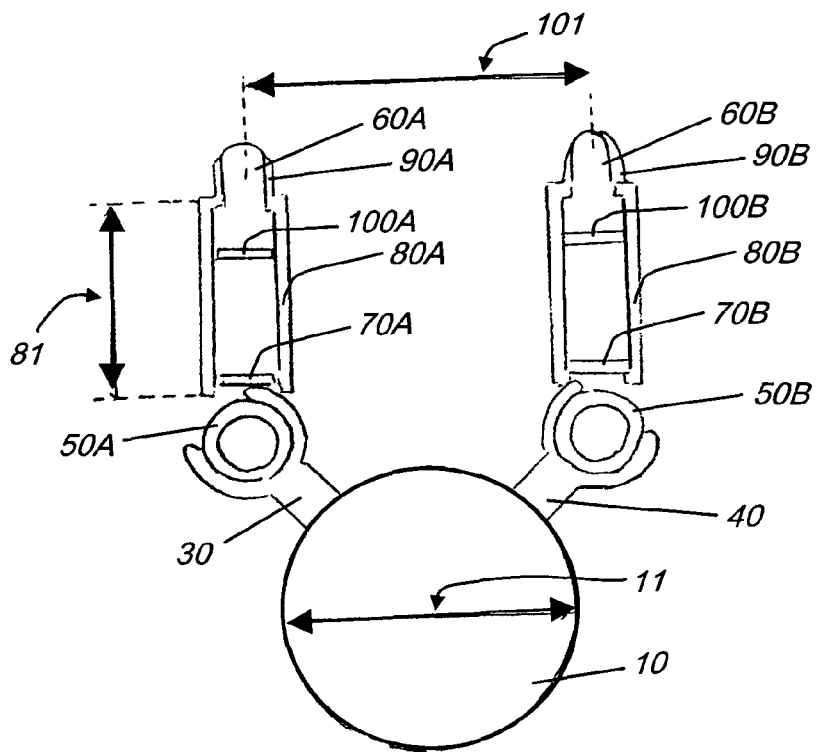
*FIGURE 3:* Caricature of a view from underneath of an illustrative, non-exclusive embodi-ment of a device according to the invention illustrating relative dimensions of components in one configuration.

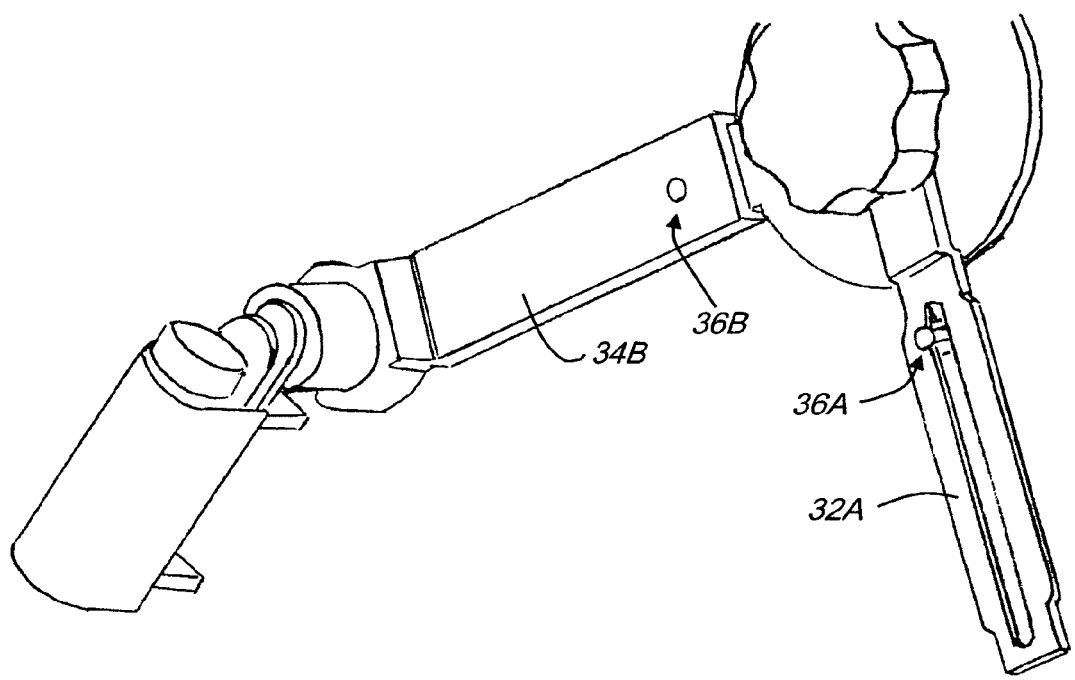
*FIGURE 4:* Caricature of an upper view of an illustrative, non-exclusive embodiment of a device according to the invention illustrating aspects of an extendible arm in one configuration.

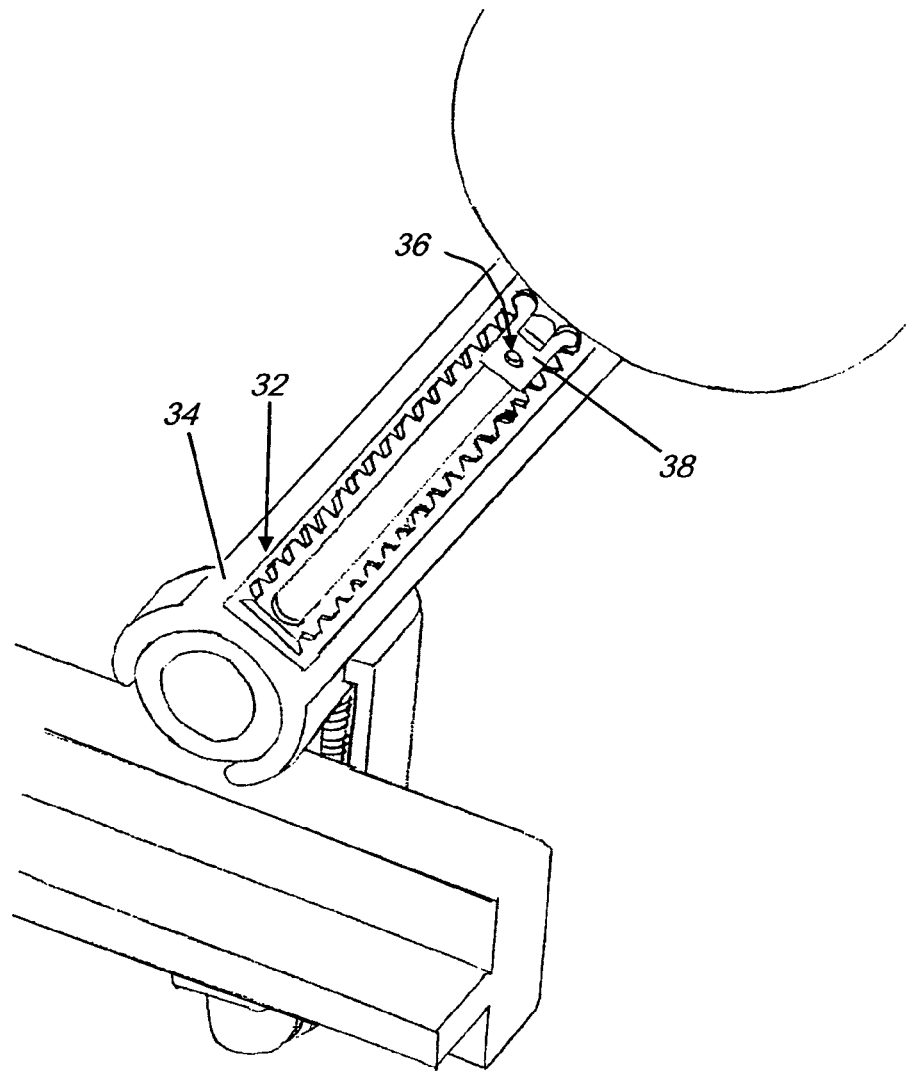
*FIGURE 5:* Caricature of an upper view of an illustrative, non-exclusive embodiment of a device according to the invention illustrating additional aspects of an extendible arm in one configuration.

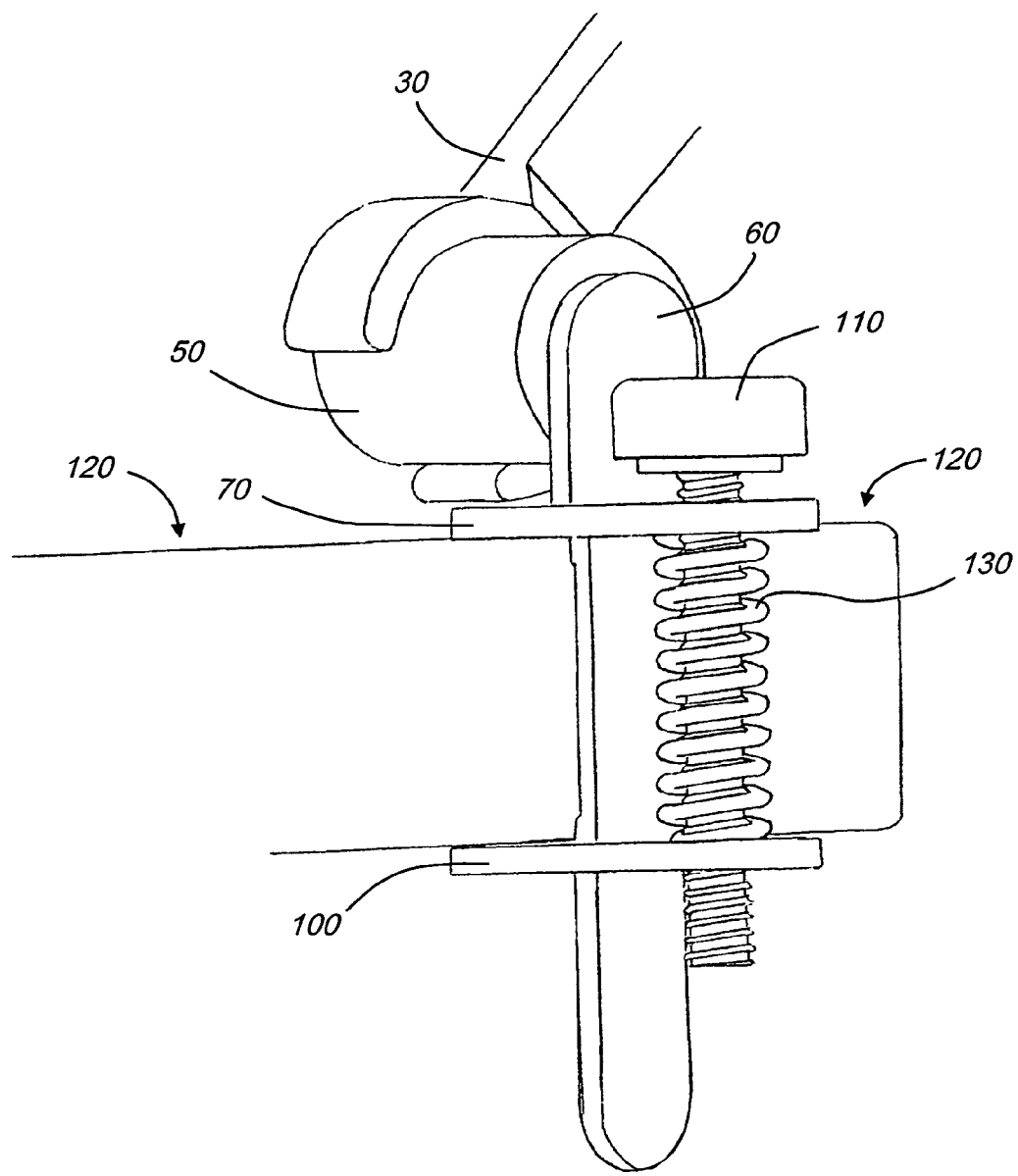
*FIGURE 6:* Caricature of an upper view of an illustrative, non-exclusive embodiment of a device according to the invention illustrating internal components of a blade lock in one configuration.

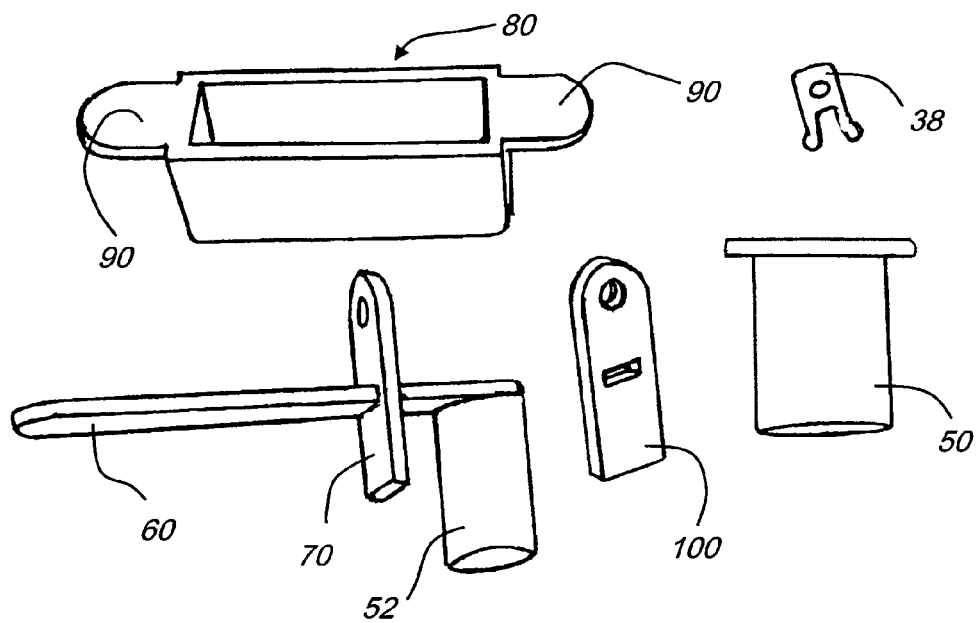
*FIGURE 7:* Caricature of views of an illustrative, non-exclusive embodiment of various parts for a device according to the invention.

WINDSHIELD BLADE LOCKING MECHANISM

FIELD OF THE INVENTION

The invention pertains to devices for securing windshield wiper blades in a fixed position.

BACKGROUND

Windshields, also known as windscreens, are among the most important safety elements in vehicles because they are the windows through which drivers view most traffic. Thus an essential function is provided when wipers clear these windows of rain, dew, dust, heavy pollen, insect residues, bird droppings, and fallen botanical detritus. Typical wipers are loosely stationary when at rest; this is helpful for accommodating their free wiping movement when the wiper is activated, but also causes inconveniences that in some cases pose a safety hazard.

Because of the loose character of wipers at rest, enterprising persons commonly place unsolicited coupons, advertisements, promotional flyers, or other unwanted literature under the windshield wipers of unattended automobiles that are in parking lots or along the edges of streets. Those papers must be removed before safe driving can ensue, indeed if the papers are torn off by the slipstream while the vehicle is in transit they represent a potential hazard for other drivers, also. However drivers who return to their vehicles after such papers are placed may not notice them until the vehicle is already moving along a highway or surface street at a high speed, when they flap in a distracting way but it is no longer convenient to reach out to remove the offending document or when the vehicle is no longer in a safe neighborhood. The failure to notice such literature before departing from the parking spot is particularly common after dark.

In addition, vandals commonly steal windshield wiper blades or the wiper arm itself. The easy deconstruction of the blade assembly and loose placement of the wiper assembly allows this to be done quickly and without the perpetrators drawing attention to themselves. It can be surprisingly expensive for the true owner to replace those parts. And when such thefts occurs shortly before an owner must drive the vehicle to an appointment in a downpour or ice storm along a route where windshield wipers cannot be bought conveniently, the owners must often choose between the enhanced risk of driving and the consequences of missing the appointment.

Moreover, the looseness of the wiper assembly also allows leaves, pine needles and other natural detritus to accumulate at the interface of the windshield and wiper blade; the debris is commonly then pinned between the windshield and the wiper blade due to a slight excess in the blade's arch. When the wiping mode is activated while such debris is trapped there, the sweep of the blade is far less efficient at removing water or ice from the windshield, substantially compromising visibility for driving. And detritus that is carried along beneath the wiper blade in the sweep of the wiper also increases the wear on the blade, shortening its useful lifecycle. This affects both the cost and the safety of their use.

Thus there is an important ongoing need for means to constrain windshield wipers in a fixed position when vehicles are parked.

BRIEF DESCRIPTION OF THE INVENTION

The invention provides an apparatus to hold one or more windshield wipers stationary against a vehicle window. The apparatus comprises a window placement module comprising a vacuum cup that has a vacuum zone and a first attachment means that is located at a point on the cup other than within the vacuum zone. The first attachment means is linked to a first point of each of one or more arms, wherein the arm(s) optionally may pivot about the first attachment means along a first zone that is above and parallel to the window surface when the invention is in use on a vehicle. Optionally each arm is extendible.

A second point of each arm is linked to a second attachment means, to which means is also linked a clamping module, optionally in a manner that allows the clamping module to pivot about the second attachment means along a second zone that is above and parallel to the window surface when the invention is in use on a vehicle.

Each clamping module comprises a top constraint member, wherein when the invention is in use on a vehicle this member rides above a windshield wiper and prevents its lifting. The top constraint member optionally also serves as a support for one or two lateral constraint members that extend downward from the top constraint member, and in combination with the top constraint member form an optionally adjustable clamp. When the invention is in use on a vehicle, lateral constraint members of the clamping module prevent a windshield wiper from rotating along the surface of a window.

In some embodiments, when in use on a vehicle the window placement module is located at a laterally central point of a window, the apparatus has two extendible arms, and each clamping modules constrains the movement of a different windshield wiper at the wiper's end that is nearest to the window placement module. In other embodiments, when in use the window placement module is located near the edge of a window on its left, right or top side, the apparatus has one arm, and the clamping module constrains the movement of a windshield wiper at the wiper's end that is nearest to the window placement module. In other embodiments, when in use the window placement module is located at a laterally central point of a window, the apparatus has one arm, and the clamping module constrains the movement of a windshield wiper at the wiper's end that is nearest to the window placement module.

In certain embodiments the invention provides a windshield blade locking mechanism comprising:
 a) a vacuum cup comprising a vacuum zone;
 b) an attachment means that is linked to the vacuum cup at a position other than within the vacuum zone;
 c) an arm that is linked to the attachment means of the vacuum cup at a first point of the arm;
 d) a blade retaining assembly that is linked to a second point of the arm wherein the assembly comprises a top constraint member.

BRIEF DESCRIPTION OF THE DRAWINGS

FIG. 1 is a caricature of an upper view of an illustrative, non-exclusive embodiment of a device according to the invention when locking windshield wipers on a vehicle window.

FIG. 2 is a caricature of an illustrative, non-exclusive embodiment of a device according to the invention illustrating the outmost end of a lock's housing.

FIG. 3 is a caricature of an illustrative, non-exclusive embodiment of a device according to the invention illustrating relative dimensions of components in one configuration.

FIG. 4 is a caricature of an illustrative, non-exclusive embodiment of a device according to the invention illustrating aspects of an extendible arm in one configuration.

FIG. 5 is a caricature of an illustrative, non-exclusive embodiment of a device according to the invention illustrating additional aspects of an extendible arm in one configuration.

FIG. 6 is a caricature of an illustrative, non-exclusive embodiment of a device according to the invention illustrating internal components of a blade lock in one configuration.

FIG. 7 is a caricature of views of an illustrative, non-exclusive embodiment of various parts for a device according to the invention.

DETAILED DESCRIPTION OF THE INVENTION

Definitions

The term "window module" as used herein refers to one or more components for adhesion to a window surface by means of a vacuum seal.

The term "vacuum cup" as used herein has its common and ordinary meaning in the art. It is used synonymously herein with the term suction cup. And it includes vacuum cups of any design that is suitable for forming a vacuum seal with another surface such as by the application of manual pressure to expel air from beneath a monolithic cup, or by application of reduced pressure from a manually or electrically powered vacuum pump.

The term "vacuum zone" as used herein refers to the surface of a vacuum cup that is capable of forming a vacuum seal with a window surface. The vacuum zone may be circular in shape or have any other shape that is not inconsistent with forming a vacuum. In many cases it is desirable for the vacuum zone to occupy and be defined by the great majority of the working surface of a vacuum cup, i.e., by the side facing a vehicle window, but the invention is not so limited.

The term "attachment means" as used herein with respect to a vacuum cup refers to a means for attachment to a vacuum cup at a location other than within its vacuum zone. Attachment means as contemplated herein include screws (screwed into an eye in the upper surface of the cup), bolts (bolted into an eye in the upper surface of the cup), rivets (passing through a portion of a feature on the upper surface of the cup), dowels (having one end in a close-fitting hole defined by the upper surface of the cup), hinges (wherein a hinge pin pierces at least one portion of a feature on the upper surface of the cup), clips (piercing or gripping a portion of a feature on the upper surface of the cup), rings (passing through a portion of a feature on the upper surface of the cup), clamps (gripping a portion of a feature on the upper surface of the cup), cotter pins (piercing and or gripping a feature on the upper surface of the cup), and other means for attaching flexible polymeric compositions to rigid hardware components. Attachment means may optionally be glued to a vacuum cup, for instance during installation in a threaded or smooth bore orifice on the upper structure of a vacuum cup, a dowel or bolt may be treated with a polycyanoacrylate-based glue to enhance the strength of the connection. Attachment means may affix a handle by attachment to its lower surface in a way to one of these.

The term "arm" as used herein refers to a component that is attachable to a window module at a first point one point of the component and attachable to a clamping module at a second point of the component.

The term "extendible" as used herein with respect to an arm refers to an arm that can optionally be lengthened such that the distance between a window module and a clamping module to which the arm is attached may be varied at will.

The term "near end" as used herein with respect to an arm or other component, refers to a location on a component in a device according to the invention such that, when the device is in its most fully extended configuration and an observer is following the path of the hardware, the position is closer to the vacuum cup than are most other locations on the component.

The term "far end" as used herein with respect to an arm or other component. refers to a location on a component in a device according to the invention such that, when the device is in its most fully extended configuration and an observer is following the path of the hardware, the position is closer to the remote lateral constraint member than are most other locations on the component.

The term "hinge component" as used herein refer to a component that is held by the far end of an arm and that allows a first supporting member of the clamping module to rotate about the hinge component. In some embodiments the hinge component may turn within the location in which it is held by the arm; in some embodiments the first supporting member may rotate about its attachment to the hinge member; in some embodiments both types of rotation may occur; in some embodiments the hinge member allows no rotation whatsoever.

The term "clamping module" as used herein refers to a combination of components that collectively can serve as a clamp on a windshield wiper.

The term "constraint member" as used herein refers to a component of a clamping module which when in use hinders a windshield wiper from moving in one or more directions. The term "top constraint member" as used herein refers to a constraint member that, when in use, rides the top of a windshield wiper and hinders its lifting. The term "lateral constraint member" as used herein refers to a constraint member that, when in use, is along one side of a windshield wiper and hinders its movement toward that side.

The term "lock" as used herein refers to a clamping module.

The term "lock housing" as used herein refers to a housing that covers one or more sides of constraint members.

The term "tightening screw" as used herein refers to a screw or bolt by means of which two or more constraint members in a clamping module may be drawn together.

The term "spring" as used herein has its usual and ordinary meaning in the art.

The term "linked" as used herein refers to linkage in a manner usual in the mechanical arts for the relative functions of the components being linked. Linkage of the vacuum cup to an attache Illustration from the Figures Important features of the invention may be understood by reference to a non-exclusive illustrative embodiment depicted in caricature by the drawings.

Referring now to FIG. 1, the invention provides a vacuum cup (10) of suitable size, shape, flexibility and composition for providing and maintaining attachment to a vehicle window surface by means of a reduced atmospheric pressure between a surface of the window and the lower surface of the cup. To the upper surface of the cup is attached the bottom portion of an attachment member such as a screw, bolt, rivet, pin or dowel, wherein the upper portion of the attachment member optionally is attached to a handle (20). The handle may be used to apply pressure to the vacuum cup through the attachment member to create suction during attachment to a window, and optionally may be pushed or turned to reduce the distance between the vacuum cup and the handle. The attachment means may pass through an orifice defined through the body of the near end of a first (30) and optionally second (40) arm. In one embodiment there is only one arm. In another embodiment there are two arms and one is located above the other at the point where the attachment member passes through each. In certain embodiments there are two arms, they are fused, and the attachment member passes through an orifice through a point at which the arms are fused. In a further embodiment there is a plurality of arms and they can be rotated about the attachment member independently of one another. In certain embodiments there are three or more arms.

Continuing to refer to FIG. 1, the far end of each arm supports a hinging component (50) that optionally permits turning of a locking module through a plane that is approximately parallel to the surface of the window. A first support member (60) such as a rod, tab, shim, plate or other support member is attached at a near end optionally rotatably to the hinging component, and is elsewhere optionally attached to or passes through a first lateral constraint member (70), passes through a second lateral constraint member (100), passes through apertures defined by a lock housing (80), and is juxtaposed against a second support member (90). The first support member optionally serves as a top constraint member to prevent lifting the windshield wiper. Optionally tightening means (110) having at least one end exposed permits locking of a windshield wiper (120) into place. An illustrative but non-exclusive list of suitable tightening means includes screws, bolts, spring clips, ratcheting triggers, quick-connects, and the like. In some embodiments there is no lateral constraint member, second support member, tightening means or housing, and the first support member when in place acts to hinder lifting of the wiper, and optionally the first support member in that embodiment is contoured in a saddle configuration that is seated upon the wiper and hinders sweeping of the blade.

Referring now to FIG. 2, additional features of the invention may be understood. This Figure depicts an embodiment in which a vacuum cup (10) to which is attached a handle (20) by an attachment means, wherein at least one extendible arm (30) is further attached to the attachment means. In this embodiment each arm has a slotted inner arm (32), a sliding sleeve (34), and a pinning member (36) that passes through the slotted inner arm and its respective sliding sleeve to hold them stationary relative to one another. A hinging component (50) permits turning of a locking module. A first support member (60) is attached at a near end optionally rotatably to the hinging member, and is elsewhere attached to or passes through a first lateral constraint member (70) and second lateral constraint member (100), passes through apertures in a lock housing (80), and is juxtaposed against a second support member (90). A tightening means (110) is a bolt that can pass through apertures defined at both the near end and far end of the lock housing.

Referring now to FIG. 3, illustrative dimension for components of the invention are illustrated as viewed from below when the invention is configured as described in FIGS. 1 and 2 above, and is attached to a window surface. The vacuum cup (10) is attached by an attachment means to at least two extendible arms (30) and (40), which are in turn attached to hinging components (50A) and (50B) respectively. First lateral constraint members (70A) and (70B) and second lateral constraint members (100A) and (100B) are attached to or passed through by the respective first support members (60A) and (60B) and reside in troughs defined by the respective lock housings (80A) and (80B). The vacuum cup circumference (11), lock housing length (81), and perpendicular distance (101) between parallel lock housings are shown for a particular embodiment. Distances depend on the relative placement of windshield wipers and on the curve and adherence characteristics of the window; there parameters differ from model to model of vehicle. Illustrative distances are 50 mm for circumference 11, 35 mm for housing length 81, and 60 mm for perpendicular distance 101.

FIG. 4 provides additional detail on an extendible arm for embodiments depicted in FIGS. 1 and 2. This drawing shows an upper view wherein the slotted inner arm (32A) is exposed for a first arm, and a sliding sleeve (34B) is exposed and covers the inner arm of a second arm. A pinning member (36A) and (36B) passes through the slotted inner arms and the sliding sleeve to hold them stationary relative to one another.

FIG. 5 illustrates further features for an extendible arm for embodiments depicted in FIGS. 1, 2 and 4. This drawing shows a view from underneath wherein the slotted inner arm (32) is held stationary within a sliding sleeve (34) of an extendible arm. In this particular embodiment the slotted inner arm (32) on its lower side defines a trough having scalloped edges. A key (38) fits within the scalloped trough. A pinning member (36) passes through apertures defined by the slotted inner arm's key (38) and the sliding sleeve (34) to hold them stationary relative to one another. In some embodiments the pinning member is a dowel that can be moved independently of the key and the sleeve. In other embodiments the pinning member is attached to the key in a permanent fashion. In alternative embodiments the pinning member is attached to the sleeve in a permanent fashion.

FIG. 6 illustrates features for the clamping module according to one embodiment of the invention. In this embodiment the embodiment is configured similarly but not identically to that shown in FIG. 1, and for clarity no lock housing is shown. An arm (30) is attached to a hinging component (50). A first support member (60) is attached at a near end optionally rotatably to the hinging component, and is slidably attached to a first lateral constraint member (70) and a second lateral constraint member (100). A tightening means (110) comprises a bolt that passes through apertures defined in the lateral constraint members (70) and (100), wherein at least one of the apertures is threaded or at least one aperture of the housing not shown is threaded; tightening of the bolt locks a windshield wiper (120) into place. The bolt in this embodiment passes through the length of a coil spring (130) that is located between apertures of the lateral constraint members to facilitate their grip on the wiper.

FIG. 7 illustrates further detail for various parts and their relationships with one another for an embodiment of the invention according to FIGS. 1 through 6. This verbal description begins at the lower right of FIG. 7 and proceeds in clockwise fashion. The hinging component (50) may be a cylindrical tube having a lip extending around one end. A hinge pin (52) for fitting within that hinging component may be attached to the near end of a first support member (60), which in turn is fitted through a slot defined by a tombstone-shaped first lateral constraint member (70) that also defines an eye for a bolt or screw. The inner portion of a lock housing (80) is shown as defining a trough, wherein the second support member (90) described in prior paragraphs may comprise two tabs extending as ledges from the edge of the lock housing and may be a monolithic piece with it. A key (38) for the inner arm of an extendible arm is also shown.

In some embodiments of the invention the first support member may be removed from the hinging component when the invention is not in use, such that the clamping module remains affixed to the wiper but the window module and arm(s) are removed. In certain embodiments the support member attached to the hinging component is the second support member instead of the first one.

In particular embodiments the suction of the applied vacuum cup may be enhanced by the use of a peripheral vacuum source such as a manually powered pump or electrically powered pump.

Components

A vacuum cup, sometimes known as a suction cup or sucker, uses negative fluid pressure of air or water to adhere to surfaces; they adhere especially well to nonporous surface. Generally the working face (defined herein as the vacuum zone) of the vacuum cup has a curved surface. When the center of the suction cup is pressed against a relatively flat smooth surface, the volume of the space between the suction cup and the flat surface is reduced, which causes the air or fluid between the cup and the surface to be expelled past the rim of the cup. When the user ceases applying pressure, the cup's elastic composition tends to resume its original shape. Because all of the air or fluid has already been forced out of the inside of the cup, the cavity developed between the cup and the flat surface has little to no air or water in it, and thus lacks pressure. The difference between atmospheric pressure on the outside and the low-pressure cavity on the inside of the cup sustains the adhesion. The duration of the effect is a function of how effectively leaks from the outside atmosphere are controlled.

The vacuum cup may be comprised of any suitable flexible material and are widely available. For instance, suitable vacuum cups are sold by SAS Automation (see http://www.sasgripper.com/product_sections/section_vacuum_cups.htm). Particularly suitable materials for the vacuum cup include chloroprene, polyurethane, nitrile rubber, silicone rubber, and viton. Chloroprene has good wear resistance, and is useful in the temperature ranges −40° to 230° F. (−40° to 110° C.). Polyurethane has excellent wear resistance, a very long life, is oil resistant, and is useful in the temperature ranges −58° to 248° F. (l50° to 120° C.). Softer polyurethanes may be used but are best on textured surfaces whereas a windshield is smooth Nitrile rubber has good wear resistance properties, is oil resistant, and is useful in the temperature ranges −20° to 225° F. (−50° to 120° C.). Silicone rubber is a soft material, is especially good for rough and textured surfaces, and is useful in the temperature ranges −86° to 392° F. (−65° to 200° C.). Note that windshields are exposed to both the hottest summer conditions and coldest winter conditions, thus the extremes of temperature noted here are relevant to choice of material.

The design of the vacuum cup may be of any type known in the art that is suitable for sustaining suction. Suitable suction cup designs include but are not limited to a flange type, a bellows cup type, a snap on or bolt type, and a push on or clamp type.

The force of a vacuum cup when in use follows the relationship F=AP, where F=force, A=area, and P=pressure. For example, for a cup of radius 2.0 cm and area $\pi (0.020 \text{ m})^2$=ca. 0.0013 square meters, the result is F=(0.0013 m$^2$)(100,000 Pa)=ca. 130 Newtons, assuming the pressure inside the cup is negligible when compared to atmospheric pressure. However the calculation requires more finesse. The specifications for sizing vacuum cups additionally focus upon lift capacity and the margin of safety. Suitable lift capacity at sea level is determined by the following theoretical relationship; actual lift capacities should be determined empirically.

$$C = 0.393 \times D^2 \times V/N$$

C=Lifting Capacity (lbs.)
D=Cup Diameter (in.)
V=Vacuum Level (in Hg)
N=Desired Safety Factor (≥2 for horizontal lifting; ≥4 for vertical lifting)

$$D = 1.61 \times [(M \times N)/(V \times U)]^{1/2}$$

D=Diameter of vacuum cup (in.)
M=Mass of lifting product (lbs. of force to be applied)
V=Vacuum Level (in mm Hg)
N=Safety Factor (≥2 for horizontal lifting; ≥4 for vertical lifting)
U=Number of Cups For the present invention a circular vacuum zone having a circumference D of about 4±2 inches (i.e., ~50±25 mm) has been found to be useful; other useful ranges are 4±1 inches, and more particularly about 4 inches. A manually-attainable lifting capacity C is desirable (e.g., in the range of 5-50 lbs., or alternatively 10-40 lbs, or alternatively 20-30 lbs., or alternatively about 25 lbs.). The lifting capacity can be higher for instance if the cup is fitted with a stopcock to allow air in when desired or is equipped with an optionally removable lever that permits greater force to be applied on one side to break a static vacuum seal and disengage the cup. A safety factor N of 1 or 2 is particularly useful but alternatively N may be 3 or 4. For purposes of the calculation, the lifted mass M may be the same as C. The figures in this section assume the use of a single vacuum cup (i.e., U=1) however a plurality of smaller cups may be used to obtain a comparable result.

The arms (including the inner arm, sleeve and key) may be comprised of one or more hard materials. Examples of suitable hard materials include metals, tough plastics and tough ceramics. Illustrative metals include aluminum and iron. Illustrative tough plastics such as nylons, polyaramids, ABS rubber, and the like. Illustrative tough ceramics include: silicon carbide that has been sintered as a laminate with graphite; alumina derivatives co-developed by William Predebon at Michigan Technological University; nacre-like biomimetic materials such as those co-developed by Robert Ritchie in the Department of Materials Science and Engineering at the University of California at Berkeley, and nacre-like biomimetic materials such as those co-developed by Antoni P. Tomsia, Sylvain Deville and colleagues at Lawrence Berkeley National Laboratory.

The arms may be linked to a hinging component or directly without rotatability to the clamping module. The tough materials cited above may be used for the composition of components in the clamping module.

VARIATIONS

Although specific embodiments of the present invention have been described above in detail, the description is merely for purposes of illustration. In addition to the embodiments above various modifications of, and equivalent elements corresponding to, the disclosed aspects of the exemplary embodiments, can be made by those of ordinary skill in the art without departing from the spirit and scope of the present invention defined in the following claims, the scope of which is to be accorded the broadest interpretation so as to encompass such modifications and equivalent structures.

We claim:
1. A windshield blade locking mechanism comprising:
a) a vacuum cup comprising a vacuum zone;
b) an attachment means that is linked to the vacuum cup at a position other than within the vacuum zone;
c) an arm that is linked to the attachment means of the vacuum cup at a first point of the arm;

d) a blade retaining assembly that is linked to a second point of the arm wherein the assembly comprises a top constraint member:

wherein the windshield blade locking mechanism has one or more arms, and wherein at least one of said arms is extendible in length and comprises an inner arm and an outer sleeve.

2. The windshield blade locking mechanism of claim 1 wherein the inner arm defines a slot along its length, and on its lower surface defines a trough with scalloped edges.

3. The windshield blade locking mechanism of claim 2 wherein a key fits within the trough of the extendible arm.

4. The windshield blade locking mechanism of claim 3 wherein a pinning member passes through an aperture defined by the outer sleeve, the slot of the inner arm, and the key when it is at a desirable point in the trough.

5. A windshield blade locking mechanism comprising:
a) a vacuum cup comprising a vacuum zone;
b) an attachment means that is linked to the vacuum cup at a position other than within the vacuum zone;
c) an arm that is linked to the attachment means of the vacuum cup at a first point of the arm;
d) a blade retaining assembly that is linked to a second point of the arm wherein the assembly comprises a top constraint member;

wherein the top constraint member: is linear; passes through a lock housing; is attached to a first lateral constraint member; and is slidably attached to a support for a second lateral constraint member.

6. The windshield blade locking mechanism of claim 5 wherein the distance between the first and second lateral constraint member is adjustably fixed by a tightening means selected from the group consisting of screws, bolts, spring clips, ratcheting triggers, and quick-connects.

7. The windshield blade locking mechanism of claim 6 wherein a coil spring is located between the first and second lateral constraints and the tightening means runs through the length of the coil spring.

\* \* \* \* \*